Patented Sept. 8, 1942

2,295,125

UNITED STATES PATENT OFFICE

2,295,125
TREATMENT OF HYDROCARBON GASES

Edwin F. Nelson, Chicago, Ill., assignor to Universal Oil Products Company, Chicago, Ill., a corporation of Delaware No Drawing. Application November 30, 1938, Serial No. 243,164

2 Claims. (Cl. 196—10)

This invention relates more particularly to the treatment of olefin-containing hydrocarbon gas mixtures such as are produced in cracking petroleum and similar oils with the primary object of producing gasoline fractions. Such gases contain relatively high percentages of ethylene, propene and butenes. A large number of recent researches in commercial operations are concerned with the conversion of this olefinic content by polymerization reactions into liquid hydrocarbons boiling within the range of gasoline.

The processes used for the conversion of the olefinic content of cracked gases into gasoline include those both of a thermal and a thermal-catalytic character. In the latter category are included those which employ solid granular catalysts containing acids of phosphorus. A type of catalyst which has extensive use commercially is the so-called solid phosphoric acid catalyst as disclosed in U. S. Patent No. 1,993,513 and others. This solid phosphoric acid catalyst may be made by the successive steps of (1) mixing the phosphoric acid with a finely divided and relatively inert carrying material such as, for example kieselguhr to form a rather wet paste (the acid ordinarily being in major proportion by weight); (2) calcining at temperatures of the order of 400–500° C. to produce a solid cake; (3) grinding and sizing to produce particles of a usable mesh; (4) rehydrating the catalyst granules at temperature of the order of 260° C. to produce an acid composition corresponding to optimum polymerizing activity. This procedure may be varied by forming particles from the original paste by extrusion or pelleting methods and following with the calcining and rehydrating steps. In the reactions taking place during calcining it is evident that some acid is "fixed" on the carrier and that some meta-phosphoric acid which has no polymerizing activity is formed. The rehydrating step evidently produces an acid composition most closely corresponding to the pyro-acid having a formula $H_4P_2O_7$ and corresponding to the double oxide formula $P_2O_5.2H_2O$.

In utilizing catalysts of the solid phosphoric acid variety in commercial practice it has been found that they gradually lose efficiency due to a number of undesirable side reactions including over-polymerization to form gummy materials which in time carbonize and coat the active surfaces and also due to the fact that the active catalytic material which is probably of an acid character gradually becomes inert due to reactions of a rather obscure character which are difficult to trace because of the relatively small amount of contamination involved. Thus while in some cases a carbonized and spent catalyst may be restored to substantially its original activity by carefully burning off the carbonaceous deposits with air or combustion gases containing oxygen and rehydrating to obtain the active acid of optimum composition, cases occur where this method of reactivation has substantially no effect and where there is a permanent loss in activity so that the ultimate yield of polymers is extremely low even when periodic reactivation is practiced. The present process is adapted to overcome these difficulties and remove the traces of contaminating substances which frequently completely paralyze the activity of the catalyst in a relatively short period of time.

In one specific embodiment the present invention comprises the treatment of olefin-containing gas mixtures with solid phosphoric acid catalysts which during previous use for olefin polymerization have lost substantial proportions of their olefin polymerizing activities, to remove from said mixtures substances deleterious to the activity of acid-containing catalysts used subsequently to convert the gaseous olefins into useful liquid hydrocarbons.

The process of the present invention is applicable to any type of olefin-containing gas mixture which is found by trial to exert a contaminating influence on solid phosphoric or other acid catalysts. Thus it can be utilized to purify the total gas mixtures from cracking plant receivers (which occasionally have a large enough content of propene and the butenes to render them suitable for catalytic polymerization processes), it can be applied also to special fractions relatively high in propene-butene content such as are commonly known as stabilizer refluxes, and its is also applicable to still more closely cut fractions consisting substantially only of butanes and butenes ("B—B" fractions) which are charging stock to plants operating to produce octenes hydrogenatable to iso-octanes having high antiknock value. Gaseous olefin-containing mixtures are treated to remove deleterious impurities by passage over solid phosphoric acid catalyst which previous use has reduced in activity for polymerizing olefins. Such partially deactivated catalysts, however, still retain considerable ability to combine with and retain impurities especially ammonia and other basic nitrogen compounds present in olefin-containing gas mixtures. For effecting such purification these gas mixtures may be passed through a pre-treating tower containing used solid phosphoric acid catalyst, usually maintained at a temperature equal to or below that usable in polymerization reactions. This purifying pretreatment may be carried out in vapor or liquid phase, the exact choice depending upon the operating pressure used in succeeding towers employed for polymerizing said gaseous olefins to valuable liquid hydrocarbons.

Also olefin-containing gases purified as outlined by treatment with a solid phosphoric acid catalyst may be used subsequently for polymerization by other catalysts such as sulfuric acid, aluminum chloride, etc., or they may be utilized in other hydrocarbon reactions where the presence of such impurities is deleterious to the catalysts used for effecting the reactions involved.

While exhaustive analytical data are lacking to show the exact nature of the compounds removed which if left would cause rapid deterioration of polymerizing catalysts, there are indications that the effect is due partly to basic compounds such as ammonia or low-boiling amines. The former may be present on account of the deliberate introduction of ammonia to prevent corrosion at points in the petroleum refining process either before the cracking plant is reached or in the cracking plant itself. Obviously, amines and ammonia may result also from the cracking of nitrogen-containing charging stocks. In either event it has been determined that the presence of these extremely small quantities of basic compounds causes rapid deterioration of the catalyst possibly due to the formation of ammonium or complex basic phosphates with the most catalytically active portions of the catalyst particles. It is now generally recognized that only relatively small areas of solid catalyst particles are sufficiently active to cause definite acceleration of chemical reactions and that large portions are substantially inert. This apparently accounts for the large effect noted when small amounts of basic compounds are formed.

While the present process is definite as to its beneficial effects on catalyst life when used on olefin-containing gas mixtures prior to their contact for olefin polymerization purposes with solid phosphoric acid-containing catalysts, it is not intended to infer that the explanations given above as to the reasons for the action are entirely adequate since analytical work to determine the exact chemical reactions involved is made difficult by the small traces of compounds present and the general sensitivity of the catalytic action. In any event it has been determined that in most instances a pretreatment with used solid phosphoric acid catalyst is of decided benefit.

The following examples are given to indicate the value of the present process in increasing the life of acid-containing polymerizing catalysts although it is not intended to limit the scope of the invention in exact correspondence with the numerical data introduced.

EXAMPLE I

Comparative tests were made in commercial polymerization plant consisting of three catalyst towers in series, operating on stabilizer reflux containing 20 to 23% by volume of propene and butenes. In one test the first tower of the series contained a fresh catalyst while the next two contained catalysts which had been used for short times during which approximately five gallons of polymer were produced per pound of catalyst. In the second test, the first tower contained a partly spent catalyst which had been used in producing approximately fifteen gallons of polymer per pound of catalyst, the catalyst of the second tower had produced only three gallons of polymer per pound and the third tower contained fresh catalyst. Average olefin polymerizations of 67 and 74%, respectively, were obtained while tests number one and two were operated during one week on approximately the same gaseous charging stock under nearly identical temperature and pressure conditions in the order of 375–500° F. and approximately 150 pounds per square inch, respectively. Consistently better results continued to be obtained in test number two using the less active catalyst in the first tower and the more active catalyst in the succeeding towers. It is thus clearly indicated that the latter practice of installing the least active catalyst in the first tower was beneficial in extending the activity of the total catalyst over a longer period of time.

In polymerization plant operation the amount of polymerization taking place in a particular tower is indicated by a rise in temperature through the tower because of the fact that the polymerization reaction is exothermic. Determination of this temperature rise is useful for estimating the activity of catalysts while in service. Accordingly rapid decreases of this temperature rise during use of a catalyst indicates rapid loss in its activity. In the second test the initial activity of the partly spent catalyst in the first tower of the series flow as evidenced by a temperature rise of approximately 130° F. indicated that its previous use as second tower in the same plant had not been appreciably harmful to its polymerizing activity. Thereafter, however, the rapid drop in temperature rise from day to day and accordingly in polymerizing activity of the catalyst placed in the first tower indicated that it was being poisoned or spoiled by impurities in the olefin-containing gas charged to the polymerization plant.

The fact that the older catalyst preceding the more active one in the series flow served as a purifier of the gas stream was demonstrated by the temperature spread through the third tower. This catalyst produced a greater temperature rise during the entire period of the second test and, as measured thereby, a higher polymerizing activity than was observed in the first tower of the first test where the fresh catalyst was exposed to the incoming unpurified gas stream.

Another point of interest was the fact that the catalyst reactivations in the three towers used with the weaker catalyst first in the series flow was completed in a shorter period of time than observed in earlier operations in reverse order with the more active catalyst first and the weaker or partially spent catalysts in the second and third towers.

EXAMPLE II

Experiments similar to those mentioned on stabilizer refluxes were made on a "B—B" fraction and also on "B—B" fraction purified by the method of this invention, but otherwise of the same composition as the untreated "B—B" fraction. The hydrocarbon constituents of these two charging stocks are represented by the following analysis of the untreated "B—B" fraction.

| | Per cent |
|---|---|
| Propene | 0.8 |
| Propane | 5.7 |
| Isobutene | 9.8 |
| n-Butenes | 26.7 |
| Butane | 56.8 |
| Pentane | 0.2 |

The comparative polymerization tests on the purified and unpurified "B—B" fractions in the presence of solid phosphoric acid polymerization catalyst were made at 340° F. catalyst temperature under pressures within the range of 650 to 670 pounds per square inch with "B—B" feed rates varying from 1.7 to 1.9 gallons of liquid "B—B" per hour per pound of catalyst.

The data given in the following table show the beneficial effects of purifying "B—B" fractions by the method of this invention. While operating on the purified charging stock, the catalyst life was approximately 60% longer and the average polymerization of butenes approximately 11% greater than in the test on the unpurified "B—B" fraction.

Table

|  | Experiment 1, untreated "BB" | Experiment 2, pretreated and purified "B-B" |
|---|---|---|
| Time on test_____hours__ | 264 | 424 |
| Initial, final and average percentage polymerization of— | | |
| Isobutene_____ | 91-58 (ave. 80) | 98-90 (ave. 94) |
| n-Butenes_____ | 57-23 (ave. 40) | 57-38 (ave. 45) |
| Total_____ | 65-31 (ave. 48) | 66-54 (ave. 59) |
| Total yield of polymer gallons per pound____ | 55 | 105 |
| Octene per cent of charge (liquid volume)_____ | 9.8 | 13.8 |
| Per cent of polymer (liquid volume)_____ | 93.2 | 92.3 |
| Bottoms per cent of charge (liquid volume)_____ | 0.7 | 1.1 |
| Octane numbers of— | | |
| Octene_____ | 84.2 | 85.2 |
| Octane_____ | 93.9 | 93.2 |
| Ammonium content of the used polymerization catalyst, grams $NH_3$ per pound of catalyst_____ | 2.78 | 0.92 |

Experiment 1 was stopped at the end of 264 hours of operation because of the low activity of the catalyst evidenced by the 31% removal of total butenes. On the other hand, Experiment 2 was terminated by exhaustion of the supply of "B—B" charging stock while the catalyst still retained a major proportion of its original activity.

At the end of the test after the catalyst had been removed from the towers, analysis showed that the catalyst used on the unpurified "B—B" had taken up three times as much ammonia as did that used in the polymerization test of 60% greater length on the purified "B—B" fraction.

The commercial tests described in the above examples show clearly that an improvement in the performance of polymerization units processing stabilizer reflux or "B—B" fractions containing small amounts of ammonia or other basic substances can be obtained by installing the weakest catalyst first in the series flow.

The character of the present invention and particularly its practical value are evident from the preceding specification and the limited examples given though neither section is intended to be unduly limiting in its generally broad scope.

I claim as my invention:

1. A process for producing normally liquid hydrocarbons from olefinic gas containing basic impurities which comprises contacting the gas with a solid phosphoric acid catalyst which has lost the major portion of its olefin polymerizing activity during previous use in olefin polymerization, whereby to remove basic impurities therefrom, and subjecting the thus purified olefins to polymerization in the presence of an acid-containing polymerizing catalyst.

2. In a process of catalytically polymerizing normally gaseous olefins, which are contaminated by an alkaline catalyst poison, by means of an acid polymerization catalyst subject to poisoning by said alkaline catalyst poison, the step of removing said contaminating alkaline catalyst poison by contacting said normally gaseous olefins with an acid polymerization catalyst which has lost its activity to polymerize said olefins to such an extent that it can no longer be efficiently used for polymerization as a result of having been used as a catalyst but which is still active to remove the alkaline catalyst poison.

EDWIN F. NELSON.